United States Patent Office 3,148,493
Patented Sept. 15, 1964

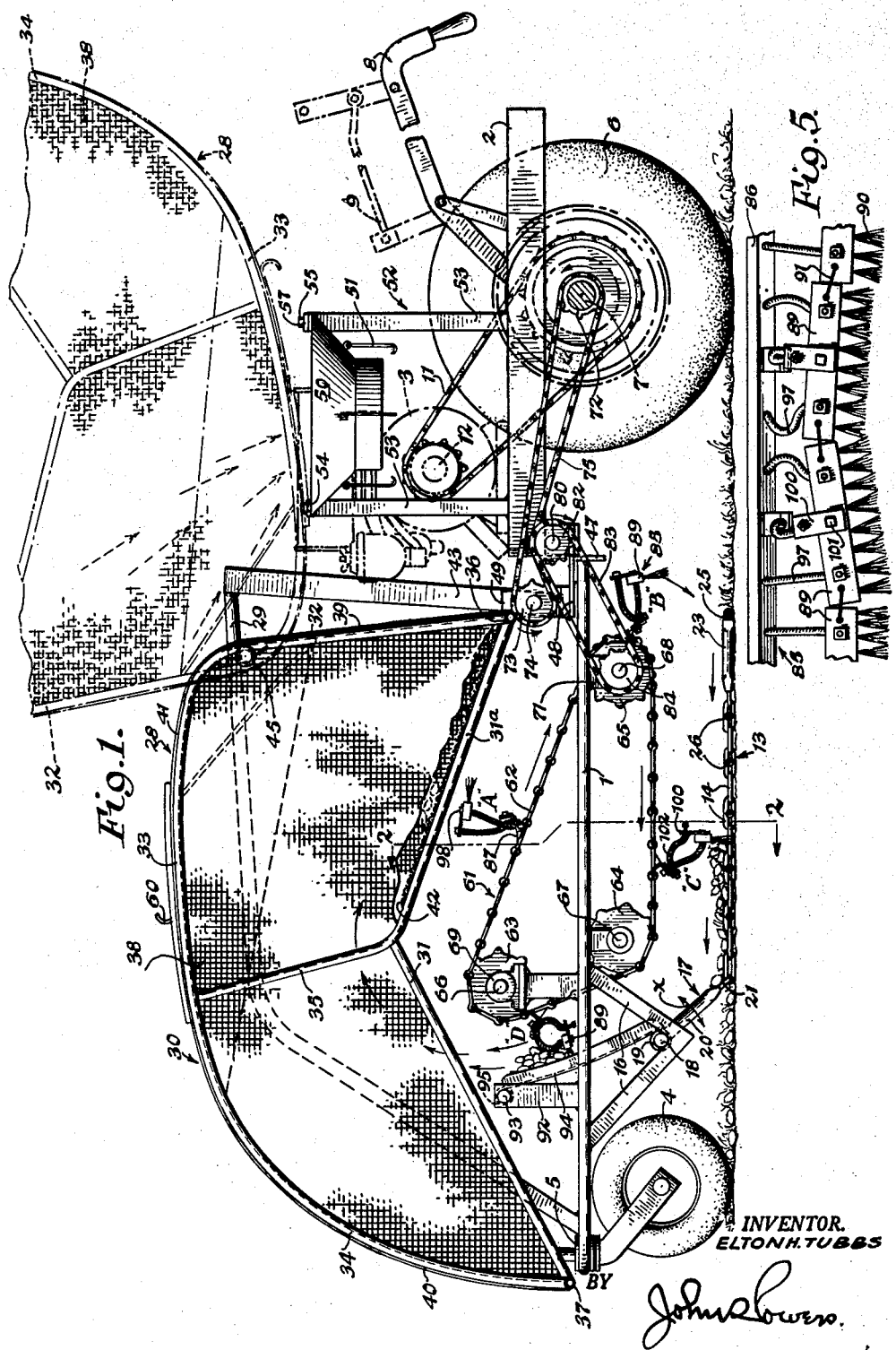

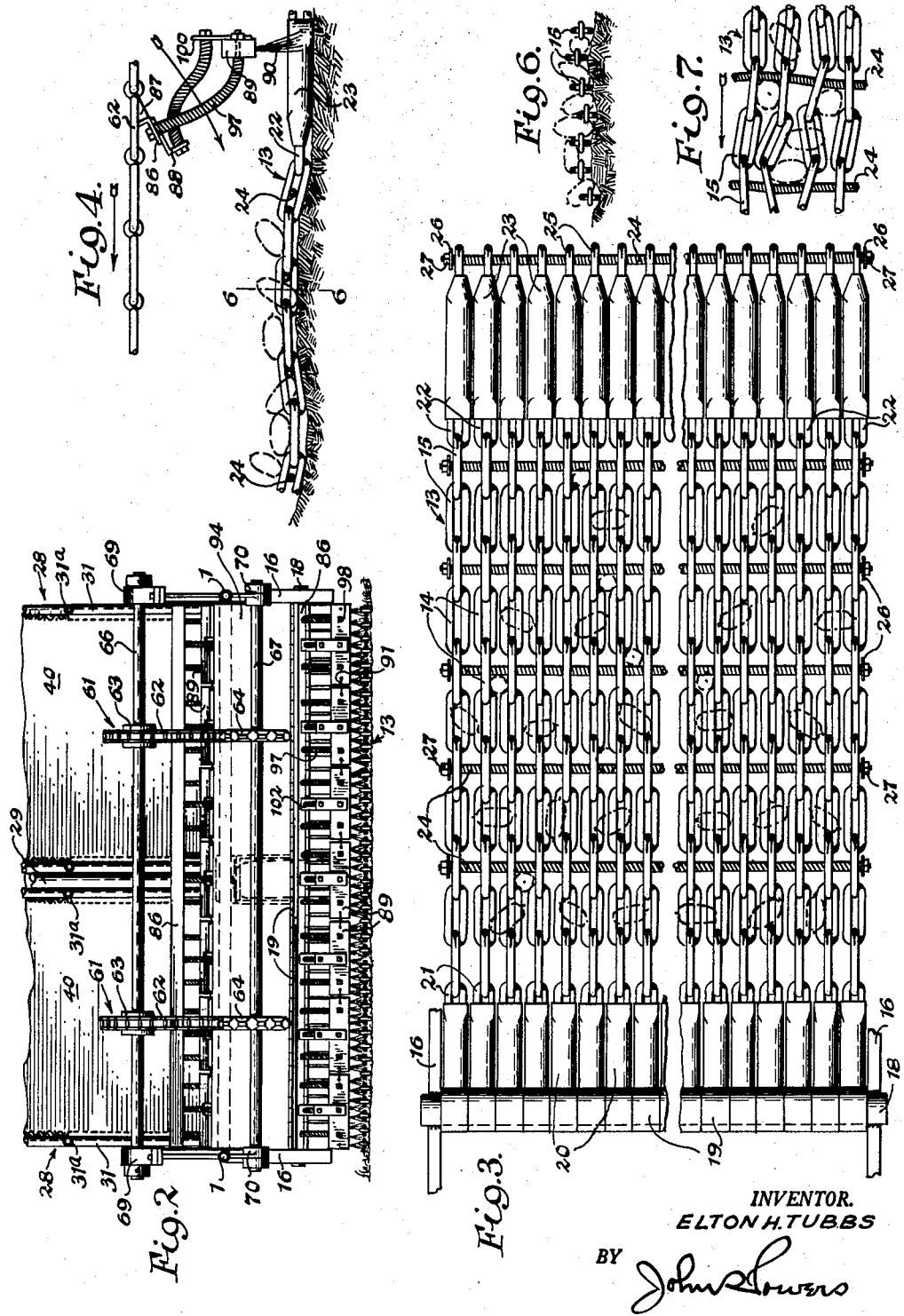

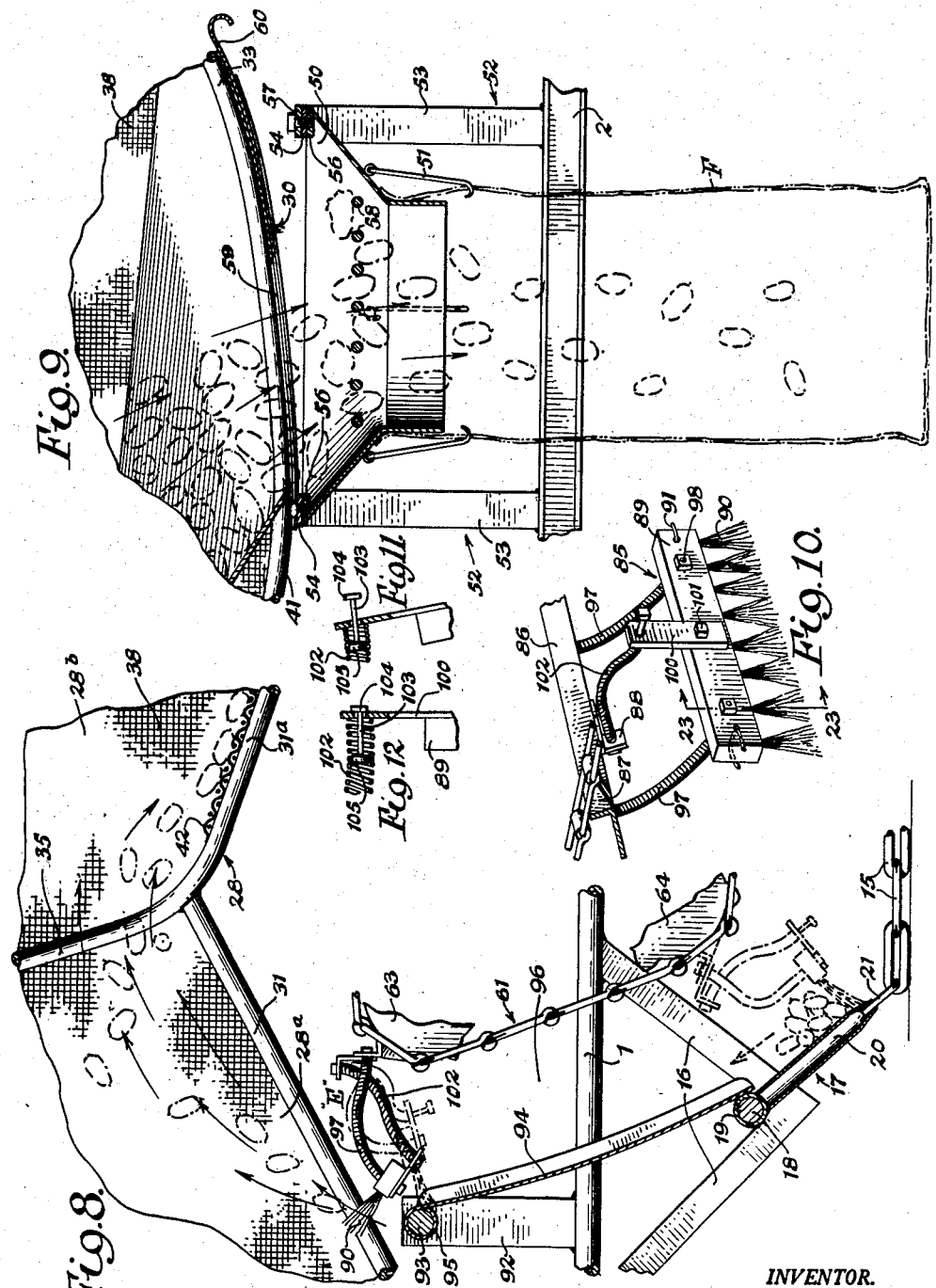

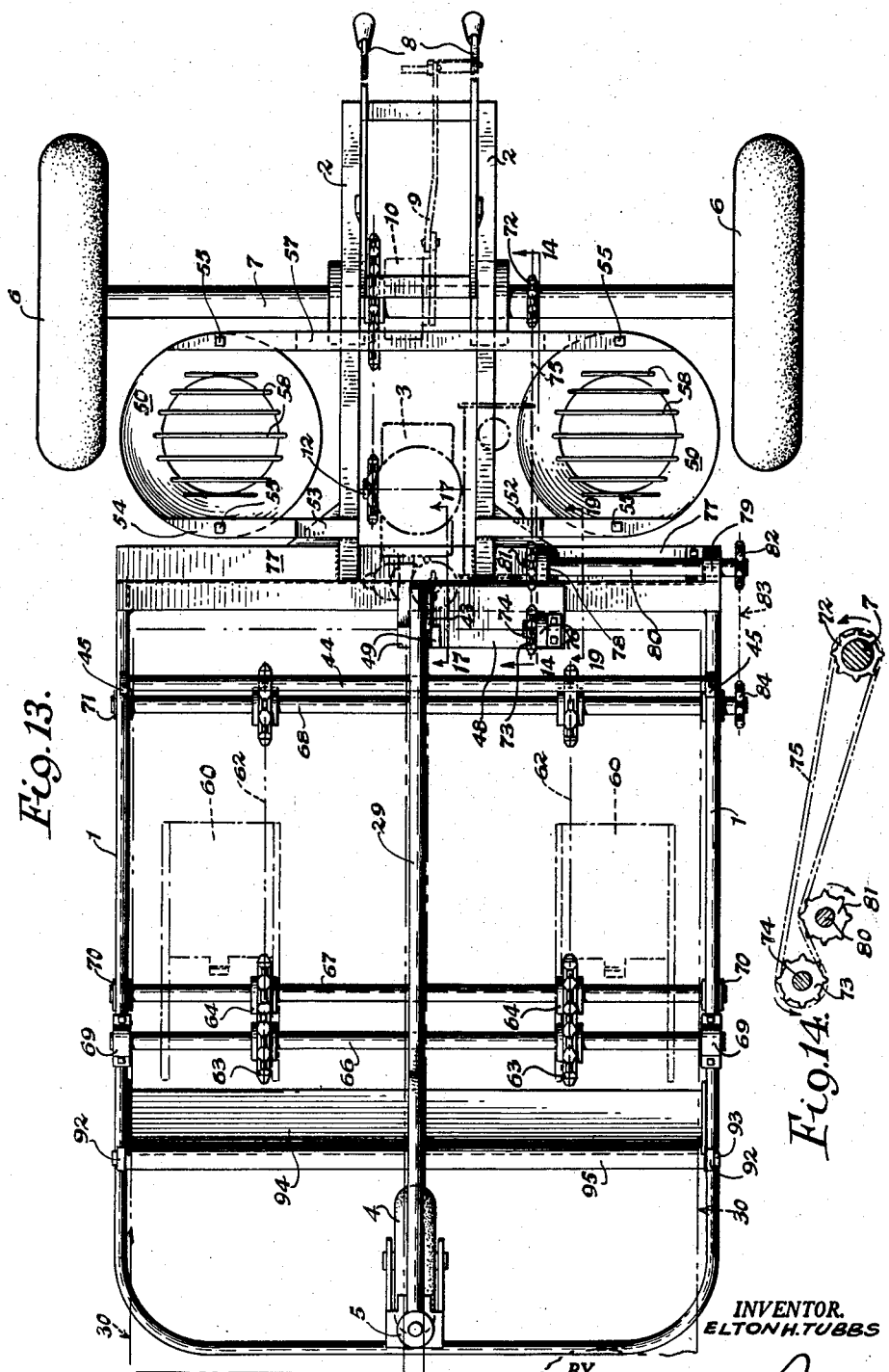

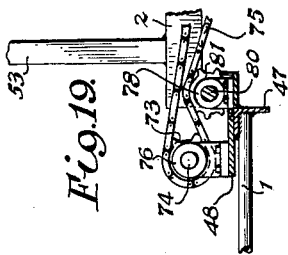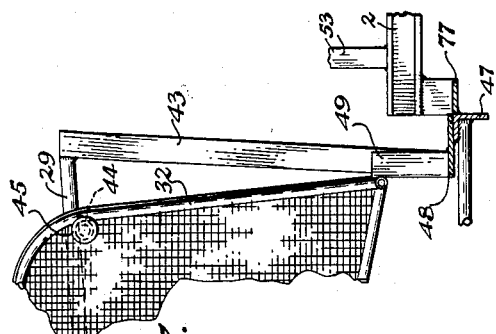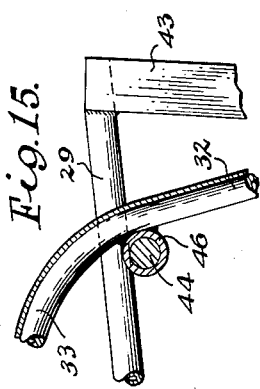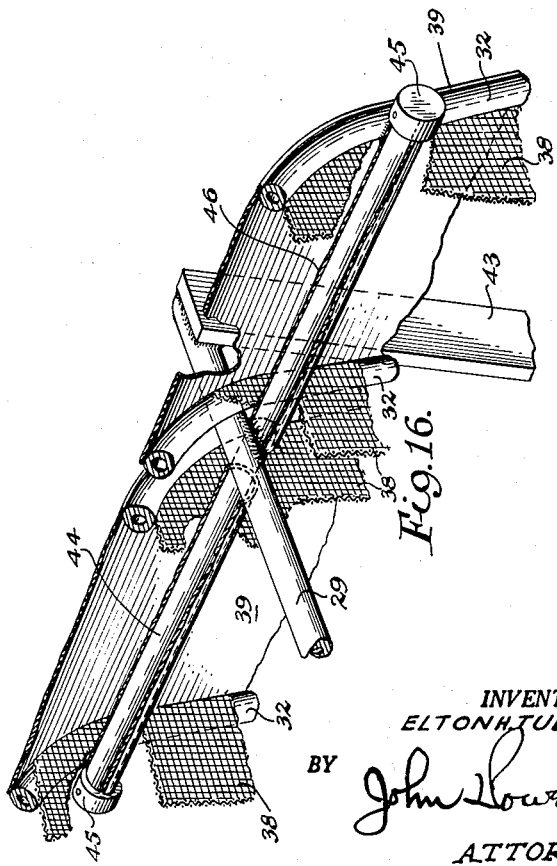

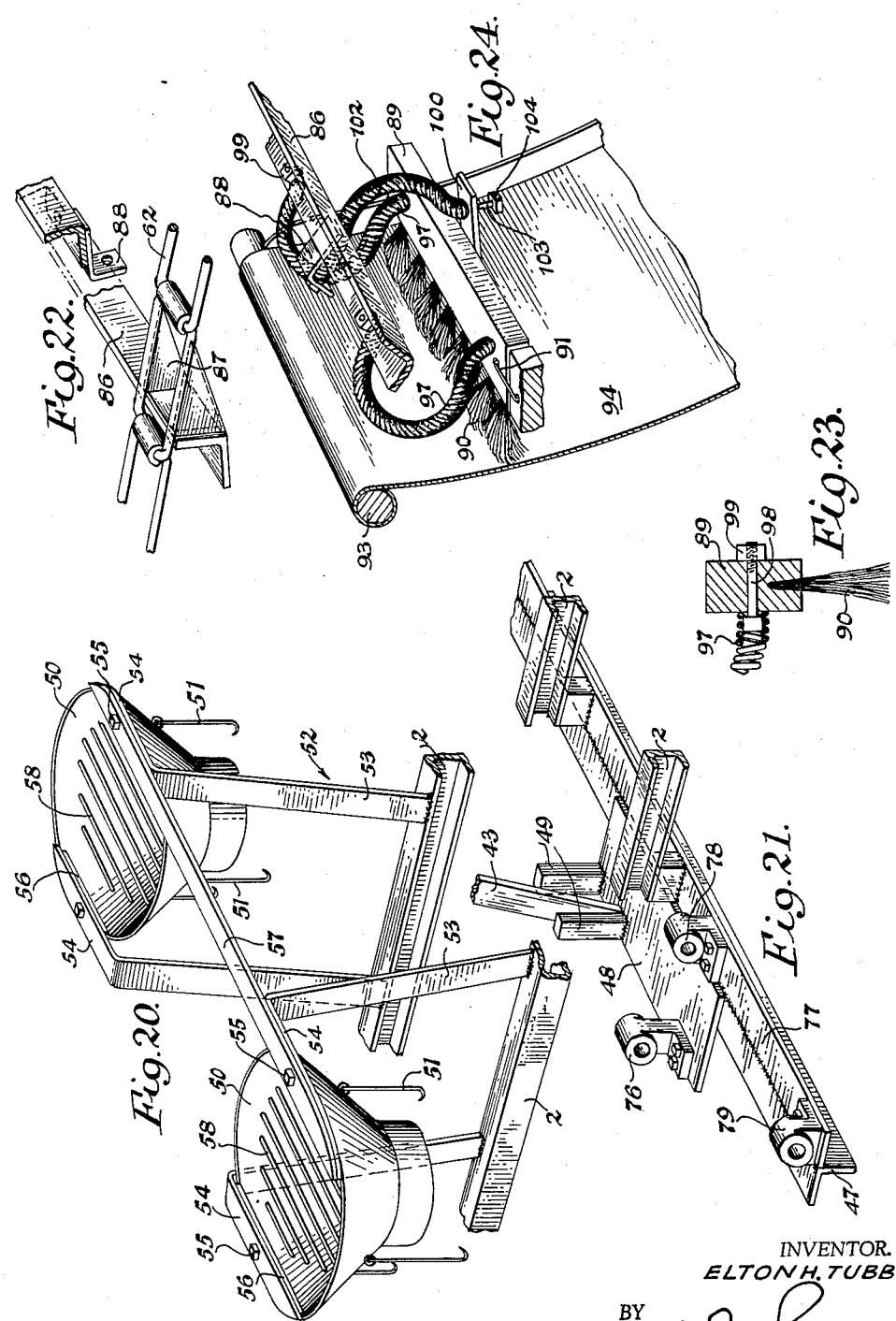

3,148,493
APPARATUS FOR HARVESTING ARTICLES SUCH
AS NUTS LYING UPON THE GROUND
Elton H. Tubbs, Westfield, N.Y., assignor to El-Flo Machinery Corporation, Westfield, N.Y., a corporation of New York
Filed Nov. 17, 1961, Ser. No. 153,099
17 Claims. (Cl. 56—328)

This invention relates to apparatus for harvesting articles such as nuts lying upon the gound, particularly pecans and other nuts which fall to the ground when ripe, the invention preferably proposing a motor driven wheeled machine under the control of a single operator. Obviously, articles lying upon the ground other than fallen nuts such as fruit or vegetables, or even small stones up to moderate size, may be harvested.

The principal objects of the invention are: (1) to provide apparatus of optimum efficiency in gathering the articles from the surface of the ground, that is to say which will quickly and with certainty pick up virtually all of the articles within its path of travel; (2) which will pick up the articles in a novel manner by an active element movable over the surface of the ground and of a construction such that it will conform to all surface variations in its action of gathering the articles from the ground, thereby to promote the quantitative efficiency of the machine; (3) which will include means for the support of the article holding bags and article collecting receptacles to which the articles are transferred from the active element, the receptacles, one in association with each bag, being so mounted that when filled to a suitable degree they may be readily brought to a position to discharge the articles into the bags; (4) which will include means for transferring the articles as they are picked by the active element from the active element to the article collecting receptacles; and (5) which will insure the delivery of the collected body of articles to the bags with the articles free from dust or adhering particles of soil and free from accompanying leaves and twigs.

Various other objects and advantages of the invention will appear as the description proceeds.

The active element of the apparatus consists of a series of trailing chains in spaced parallel relation, the chains being of the order of three feet in length and as a series having a transverse extent of approximately three feet. The individual links of the chains are of elongated form and have a lineal extent of the order of three inches and the links in transverse rows will preferably be alternately in vertical and horizontal planes. The chains conform to irregularities in the surface of the ground over which they are dragged and the spacing of the chains is such that their weight will cause the articles lying upon the ground to move through the spaces between adjacent links of the adjacent chains to positions in which they rest on top of the chains. The article collecting receptacles are arranged above the chains and are mounted for movement between receiving positions and discharging positions. An endless article conveyor is mounted between the chains and the article collecting receptacles and transfers the articles from the chains to the collecting receptacles. The conveyor includes a number of transversely arranged article engaging devices which are operative to move the articles along and from the chains and to discharge them into the collecting receptacles. The article engaging features of these devices are preferably brushes arranged in transverse series and additionally effective to brush from the articles adhering dust or particles of soil, thereby to insure the delivery of the articles in a clean condition.

In the drawings which illustrate a machine constructed in accordance with the principles of the present invention and particularly suited for harvesting pecan nuts lying upon the ground:

FIGURE 1 is a side elevation of the machine in a form now considered as preferred, with the nut collecting receptacles shown in full lines in their nut receiving position and in ghost lines in their nut discharging positions, with the rear axle shown in section, and with the motor and its associated elements shown in dot and dash lines.

FIGURE 2 is a transverse sectional view on the line 2—2 of FIGURE 1.

FIGURE 3 is a plan view of the system of chains which constitute the active element of the machine.

FIGURE 4 is a fragmentary side elevation of the system of chains, the nut conveyor and one of the transversely arranged nut engaging devices.

FIGURE 5 is a fragmentary rear elevation of adjacent transversely arranged nut engaging devices.

FIGURE 6 is a fragmentary transverse sectional view on the line 6—6 of FIGURE 4.

FIGURE 7 is a fragmentary plan view of a number of chains to show the manner in which the nuts under the weight of the chains move between adjacent links of the chains to positions wherein they rest on top of the chains.

FIGURE 8 is a fragmentary side elevation, partly in section, showing one of the nut engaging devices in its operation of discharging the nuts into a collecting receptacle.

FIGURE 9 is a fragmentary vertical longitudinal sectional view showing a nut collecting receptacle positioned to discharge the nuts into a receiving bag.

FIGURE 10 is a perspective view of one of the nut engaging devices in the position which it assumes when moving over the system of chains as shown in FIGURE 3.

FIGURE 11 is a fragmentary vertical horizontal sectional view showing one of the nut engaging devices in the position in which it is held when moving over the system of chains.

FIGURE 12 is a fragmentary vertical logitudinal sectional view showing one of the nut engaging devices in the position which it assumes for the discharge of the nuts into a collecting receptacle.

FIGURE 13 is a top plan view of the machine.

FIGURE 14 is a detailed sectional view on the line 14—14 of FIGURE 13.

FIGURE 15 is a fragmentary longitudinal sectional view, partly in elevation, showing details of the pivotal mounting of each of the nut collecting chambers.

FIGURE 16 is a fragmentary perspective view, partly in section, also showing details of the pivotal mounting of each of the nut collecting chambers.

FIGURE 17 is a fragmentary longitudinal sectional view on the line 17—17 of FIGURE 13, sundry parts being shown in side elevation.

FIGURE 18 is a fragmentary perspective view, partly broken away, showing certain details of the upper wall and the rear end wall of each of the nut collecting chambers.

FIGURE 19 is a fragmentary longitudinal sectional view on the line 19—19 of FIGURE 13, sundry parts being shown in side elevation.

FIGURE 20 is a perspective view of the bag holding hoppers and the parts by which they are supported.

FIGURE 21 is a perspective view showing details of bearing supporting plates and associated parts located at the rear end of the chassis.

FIGURE 22 is a perspective view, partly in section, showing certain details for the support of the nut engaging devices from the endless chains which form parts of the conveyor.

FIGURE 23 is a vertical sectional view on the line 23—23 of FIGURE 10.

FIGURE 24 is a fragmentary perspective view showing the positions of the parts of the nut engaging devices immediately prior to their discharge of the nuts into the nut collecting receptacles.

The various operating parts are carried by a wheeled chassis or frame 1 such as is provided in a well-known form of farm tractor, the chassis having a rearward extension 2 for the support of the motor 3, an internal combustion engine (shown in dot and dash lines in FIGURE 1) which supplies power for the propulsion of the machine along the ground. A centrally located front supporting wheel 4 is mounted casterwise in a bearing 5 carried by the transverse front bar of the chassis 1 and a rearwardly located pair of propulsion wheels 6 is mounted on a rotatable transverse axle 7 driven from the motor 3. The frame 2 carries a rearwardly projecting pair of handles 8 which are grasped by an operator who walks along the ground in the rear of the machine and uses the handles 8 for steering purposes. One of the handles 8 carries a handle operated linkage 9 (shown in dot and dash lines in FIGURES 1 and 13) for the control of the clutch 10 (FIGURE 13) by which the axle 7 is coupled to or disconnected from the chain and sprocket gearing 11 which serves for the drive of the axle from the shaft 12 of the motor 3. Sundry parts for the support of various elements of the machine are connected to the chassis 1 and its extension 2 and will be identified as the description proceeds.

Means resting upon the ground and trailed from the chassis or frame 1 are provided to cam nuts or other articles, as lying below said means upon the ground, to positions above said means to be supported thereon and movable therewith. Such means are shown as comprising chain drag means or a system of chains for collecting the nuts from the ground and is designated generally as 13 and includes a transverse series of juxtaposed trailing chains 14 having elongated and hence non-circular links 15, the chains 14 being normally in parallel and suitably spaced relation. A chain length of the order of three feet, a chain link length of the order of three inches, and a chain system so characterized and having a transverse extent of the order of three feet have been found satisfactory for the purposes in view.

The system of chains is supported from the side bars of the chassis 1 by brackets 16 which are preferably of V-shape and are arranged near the front end of the chassis and preferably just behind the front wheel 4. The chains 14 are severally connected to pivotally mounted hangers designated generally as 17 (FIGURES 1 and 8) which are supported by a transverse rod 18 extending between and cradled in the brackets 16 with its ends secured as by welding. The hangers 17 are mounted for individual swinging movements about the rod 18 as an axis (as indicated by the arrows X in FIGURE 1) and include sleeves 19 loosely fitted upon the rod 18 in mutually adjoining relation and tubular arms 20 connected to the sleeves and extending rearwardly and downwardly. Half links 21 secured to the lower ends of the arms 20 connect them to corresponding chains. Thus, the forward ends of the chains are connected to the frame for individual free movement confined to an upright plane.

As shown in FIGURE 3, the chains 14 are preferably so arranged that their links 15 in one transverse row will normally occupy parallel planes which are generally upright and in an adjacent transverse row will normally occupy a common plane which is generally horizontal. At their ends the chains 14 are severally connected by half links 22 to elongated tubular skid elements 23 in adjoining relation. The arms 20 in their adjoining relation, in addition to connecting the chains 14 to the rod 18, also are cooperative with the tubular elements 23 in their adjoining relation to prevent the chains 14, due to irregularities in the ground surface, from piling on top of one another. Thereby the arms 20 and the elements 23 contribute to the maintenance of the chains in substantially parallel relation while permitting their flexibility of action as a series and individually in their discharge of the function of collecting the nuts from the surface of the ground. Of equal importance in the prevention of the chains from piling on top of one another is their prevention from spreading apart from one another due to irregularities in the ground surface or to the pressure exercised by underlying nuts. For this purpose transverse coil springs 24 extend through the transversely alined openings of the several transverse rows of links 15 which occupy vertical planes, one of the springs 24 also extending through the transversely aligned openings of the half links 25 carried by and projecting rearwardly from the tubular elements 23. The springs 24 are maintained in their operative positions by retainer means such as washers 26 adjacent the end or outermost links of the transverse series which occupy vertical planes, the washers 26 being confined in position by short bolts 27 which are tapped into a number of the end coils of the springs 24. It will be noted that the springs 24 have flexibility such that they will yield in all directions, that is to say forward, backward, up and down, thus permitting the free action of the chains 14 in their conformity to the surface of the ground and in the displacement of their links 15 by the underlying pecans. Any tendency of the chains 14 to spread apart is yieldably resisted and thus minimized by the springs 24 through the confining action of the washers 26 upon the chains.

FIGURES 4, 6 and 7 illustrate the manner in which the nuts are brought from the surface of the ground to positions in which they rest upon the chains. FIGURE 4 shows irregularities in the ground surface in the direction of the forward travel of the chains (indicated by arrows in FIGURES 1 and 7) and FIGURE 6 shows surface irregularities in the transverse direction. FIGURES 4 and 6 also show the manner in which the chains individually yield in conformity to surface irregularities. As the chains travel over the nuts they tend to drag the nuts with them and the nuts, so dragged and under the weight of the chains, will be moved between adjacent links of adjacent chains, as shown in FIGURES 4, 6 and 7, to positions in which they will rest upon the chains. It will be noted, as shown in FIGURE 7, that as any of the nuts may bear against the springs 24 they will be positively dragged by the springs in the forward direction of travel of the chains. In effecting the movement of the nuts to rest upon the chains and having in mind the curved outlines of the nuts, the relatively heavy chain links may be said to have a cam-like action upon the nuts in displacing them from the surface of the ground and bringing them to positions above the chains.

The nut collecting receptacles, generally designated as 28 (FIGURES 1, 8 and dot and dash lines, FIGURE 13), are supported above the chassis 1 and in overlying relation to the chains 14 by a centrally located longitudinally extending frame bar 29.

In the embodiment illustrated, two nut collecting receptacles are shown in adjacent parallel relation. In each instance they include a pair of longitudinally disposed parallel frames 30. Each frame 30 has connected lower longitudinal bars 31 and 31a which together form a longitudinal lower bar of inverted V-shape, a substantially vertical rear bar 32, a top bar 33, a substantially vertical front bar 34, and an intermediate vertical bar 35. The framework of each receptacle also includes a transverse connecting bar 36 extending between the rear bars 32 near their lower ends, and a transverse connecting bar 37 extending between the front bars 34 at their lower ends. The ends of the bars 31 are connected to the lower ends of the corresponding vertical bars 34 and the ends of the bars 31a are connected to the lower ends of the bars 32. Each receptacle also includes walls, namely, side walls 38 preferably of wire mesh, a rear end wall 39, a front wall 40, an upper wall 41 which extends between the walls 39 and 40, the walls 39, 40 and 41 being preferably provided by an integral member of sheet metal, and a rearwardly and downwardly inclined bottom wall 42, preferably of wire mesh, which extends between and is connected to the bars 31a and extends from the upper ends of the bars 31a to the transverse connecting bars 36. The space between the lower longitudinal bars 31 is open and is an entrance space 28a through which the nuts are thrown in the curved direction indicated by the arrows in FIGURES 1 and 8 into the receiving chamber 28b in which they fall upon the bottom wall 42 and, as confined by the rear end walls 39, accumulate to a suitable degree.

The frame bar 29 is rigidly connected at its front end to the casing of the bearing 5 and at its rear end to an upright standard 43. The frame bar 29 serves for the support of a transverse rod 44 (FIGURES 15, 16 and 17) which forms an element of the pivotal mounting of the nut collecting receptacles 28 and extends through openings in the side walls 38 of the receptacles, the rod 44 being preferably provided at its ends with removable caps 45 which adjoin the outer side walls 38 of the two receptacles. The rod 44 is preferably arranged below the frame bar 29 and is rigidly connected to it as by welding (FIGURE 16). The pivotal mounting of the receptacles 28 is completed by sleeves 46 which surround the bar 44 and are rigidly secured, as by welding, to the rear bars 32 of the frames 30. A transverse bar 47, preferably of angle iron cross section (FIGURES 17 and 19), connects the rear ends of the side bars of the chassis 1 and supports a horizontal plate 48 (FIGURES 19 and 21) to which the standard 43 is attached as by welding. The plate 48 also carries upright posts 49 which cooperate with the bars 36 of the frames 30 as stops in holding the collecting receptacles 28 in their nut receiving positions (FIGURE 1). It will be noted that the receptacles 28 are maintained in such positions by a two-point support, viz., by the transverse bar 46 as connected to the frame bar 29 and by the posts 49 as engaged by the frame bars 36.

The nut holding bags F are indicated in dot and dash lines in FIGURE 9 and the assembly for their support (FIGURES 1, 9 and 20) is carried by the chassis extension 2 and is located rearwardly of the nut collecting receptacles 28 as normally positioned.

The bags F are supported in alinement with funnels 50, one for each receptacle 28, preferably by means of depending pivotally mounted hooks 51 carried by the funnels. Each funnel is supported from a corresponding side bar of the chassis extension 2 by a pair of brackets 52 of substantial L-shape, each bracket having an upright arm 53 directly attached, as by welding, to a corresponding side bar of the chassis extension 2 and a horizontal arm 54, the arms 53 having a suitable upward and outward inclination to enable the suspended bags to clear the chassis 2 and the arms 54 extending laterally outward from the upper ends of the arms 53. The arms 54 may be attached to the funnels 50 in any suitable manner but are preferably secured as by bolt fastenings 55 to attachment plates 56 fitted within the mouths of the funnels and welded to their annular walls. As a precautionary measure a bracing bar 57 extends between the funnels with its end portions overlying the horizontal arms 54 of the rearmost brackets 52, the bar 57 being secured at its ends by the bolt fastenings 55.

Parallel bars 58 (FIGURES 9, 13 and 20) extend across the mouth of the funnel and function to screen any oversize stones or pebbles which may have been picked up by the chains 14.

The upper walls 41 of the nut collecting chambers are each provided with a nut discharging opening 59 (FIGURE 9) normally closed by a slidably mounted gate 60. When the operator of the machine determines that the nuts have accumulated upon the bottom walls 42 to a degree requiring their discharge, he swings the nut receptacles 28 about the bar 44 as an axis to positions (as shown in FIGURE 9 and in ghost lines in FIGURE 1) in which they overhang the funnels 50, the receptacles 28 being supported in such positions by the bar 44 and by the horizontal arms 54 of the foremost brackets 52. The part of the upper wall 41 which overhangs the mesh bottom wall 42 is shaped to function as a hopper in the inverted position of each receptacle 28 whereby the nuts will be directed toward the openings 59. With the inverted receptacles 28 thus supported the operator moves the gates 60 to uncover the openings 59 (FIGURE 9) whereupon the nuts fall into the bags B. When the nuts have thus been discharged the gates 60 are moved to close the openings 59 and the receptacles 28 are then moved to their normal nut receiving positions.

The nuts are transferred from the chains 14 to the nut collecting receptacles by an endless conveyor mechanism designated generally as 61 which is driven by sprocket and chain gearing from the motor 3, the axle 7 being preferably utilized as an element of such gearing.

The conveyor mechanism 61 includes a pair of suitably spaced endless driven chains 62 (FIGURES 1 and 13) in transversely alining relation which carry the means, later to be described, for depositing the nuts in the nut collecting receptacles. Each chain 62 travels in a triangular path which includes at its front end a forwardly and upwardly directed leg, at its upper side a rearwardly and downwardly directed leg at its lower side a horizontally directed leg along which the chain moves in a forward direction. This path is prescribed by three sprockets over which each chain 62 is trained, namely, a forwardly located upper sprocket 63, a forwardly located lower sprocket 64 and a rearwardly located driving sprocket 65. The sprockets 63, 64 and 65 are severally mounted upon transverse shafts 66, 67 and 68, severally journalled in bearings 69, 70 and 71 carried by the side bars of the chassis 1.

Chain and sprocket gearing is preferably utilized for the drive of the conveyor mechanism 61 from the axle 7 in its utilization as a driving shaft. This gearing includes a sprocket 72 mounted on the axle 7, a sprocket 73 mounted on a stub shaft 74 and a chain 75 connecting the sprockets 72 and 73, the stub shaft 74 being journaled in a bearing 76 (FIGURES 13 and 21) carried by the plate 48. The bar 47 also carries a transversely extending horizontal plate 77 located rearwardly of the plate 48 and to and upon which the side bars of the chassis extension 2 are connected. The plate 77 supports bearings 78 and 79 for a transverse countershaft 80 which carries at its ends sprockets 81 and 82, the sprocket 82 being connected by a chain 83 to a sprocket 84 mounted on a projecting end of the shaft 68. The sprocket 81 is driven by the chain 75, being located under and engaged by its lower run (FIGURE 14). From the foregoing description it will be noted that the axle 7 drives the countershaft 80 which in turn drives the shaft 68 of the conveyor mechanism 61, the rotation of the sprocket wheel 81 as the drive for the countershaft being in a direction reverse to the direction of rotation of the sprocket wheels 72 and 73 whereby the lower runs of the chains 62 are forwardly directed.

The conveyor mechanism 61 also includes nut engaging devices having support from the chains 62 and provided in an appropriate number of series with a plurality of the devices transversely alined in each series (four series being assumed in FIGURE 1), one of the nut engaging devices, designated generally as 85, being shown in detail in FIGURE 10.

The number of nut engaging devices in a transverse series may be varied within practical limits, seven of the devices being suggested as preferable and being shown in FIGURE 2. The means of support for each series of nut engaging devices (FIGURE 22) includes a transverse bar 86 of angle iron section, FIGURE 22 showing the bar 86 in the position which it occupies along the lower forwardly directed runs of the chains 62. The means of connection between the bar 86 and the chains 62 consists of brackets 87 rigidly attached, as by welding, to the upper leg of the bar 86 (FIGURE 22 being considered) and to the side bars of corresponding rectangular links of the chains 62. All of the nut engaging devices of a series are connected, in a manner to be described, to the lower leg of the bar 86 (FIGURE 22 being considered) and each of the engaging devices in the series is connected at a central point, in a manner to be described, to an angle bracket 88 secured to the lower leg of the bar 86.

Each of the nut engaging devices 85 (FIGURE 10) is preferably in the form of a brush comprising a transversely extending head 89, preferably of wood, and a transverse series of projecting bristles 90 of relatively stiff resilient material. In the forwardly directed movement of the engaging devices (FIGURE 1) the bristles project downward from the heads 89 and bear upon the chains 14, moving or sweeping the nuts forwardly along the chains in an accumulating pile. The nut engaging devices 85 are each flexibly and resiliently, and therefore tiltably, connected to the bars 86 and the brackets 87 by means to be later described. With the nut engaging devices so supported it is desirable that the heads 89 of each transverse series be positively maintained in a common transverse plane and that their tilting movements, in conformity to ground surface irregularities, be suitably limited. For these purposes the heads 89 of a series are connected to adjacent heads by links 91.

The side bars of the chassis 1, near the front end of the chassis, carry upright brackets 92 (FIGURES 1, 8 and 13) which support a transverse rod 93. An apron 94 extends transversely between the chassis side bars forwardly of and in substantially parallel relation to the forward upwardly directed runs of the chains 62. The apron 94 is formed along its upper edge with a sleeve 95 which surrounds the bar 93, the apron being thereby hung in pendant relation from the bar 93 with its lower portion resting loosely against the sleeves 19 of the hangers 17. The spacing of the apron 94 from the chains 62 is such as to leave a path 96 (FIGURE 8) through which the nut collecting devices 85 move upward with their bristles 90 bearing upon the apron. The path 96 terminates immediately below the entrance spaces 28a of the nut collecting receptacles 28 and when the bristles 90 clear the upper end of the apron 94 the brush heads 89 are actuated in a rapid spring propelled free upward and inward movement, free with respect to the chains 62, with the result that the piles of nuts which have accumulated upon the bristles are thrown through the entrance spaces 28a and into the receiving chambers 28b in which they fall upon the bottom walls 42 and accumulate in plies confined by the rear walls 39. Inasmuch as the heads 89 of a transverse series of nut engaging devices 85 are maintained in horizontal alinement by the links 91 all of the nut engaging devices of a series will be actuated simultaneously and with uniform power in throwing the nuts into and through the entrance spaces 28a. If any of the nuts (and the number will be very few) should drop short of the receiving chambers 28b they will merely fall upon the chains 14 and will be picked up by a succeeding nut engaging device 85.

The heads 89 of the nut engaging devices are supported from the bar 86 (FIGURE 10) by a pair of supporting coil springs 97 connected to the heads adjacent their ends (FIGURES 10 and 23) by bolts 98 fixedly mounted within the outer ends of the springs 97 with their shanks extending through and projecting beyond the brush heads 89 and carrying securing nuts 99, the brush heads 89 being securely confined between the outer ends of the springs 97 and the nuts 99. The inner ends of the springs 97 are secured in like manner (FIGURE 4) to the leg of the bar 86 which is the lower leg when the nut engaging devices are moving forward along their lower horizontal path. Each brush head carries at a central point a projecting flat bracket 100 rigidly secured by a fastening 101 and directed upward in the forward horizontal movement of the nut engaging devices. The bracket 100 is connected by a positioning coil spring 102 to the angle bracket 88. At its outer end the spring 102 carries a projecting stem 103 (FIGURES 11 and 12) which extends loosely through an opening in the bracket 100 and is provided with an outer head 104 functioning as a stop and with an inner head 105 rigidly secured within the spring 102 at a point near its outer end. In certain positions of the nut engaging devices the springs 102 will be under compression and the heads 104 will be spaced forwardly from the bracket 100 (FIGURE 11). In other positions the compression of the springs 102 will be relieved (FIGURE 12) and the heads 104 will bear as stops against the brackets 100. The springs 97 and 102 are flexible and resilient in all directions and have normal linear curvatures which can best be described, with reference to FIGURE 10, as concave for the springs 97 and as convex for the springs 102. The springs 97 and 102 cooperate in positioning the brush heads 89 and the springs 97 additionally function in imparting to the brush heads, when the bristles 90 clear the upper end of the apron 94, the rapid free upward and inward movement above referred to whereby the piles of nuts accumulated upon the bristles are thrown through the entrance spaces 28a. The flexibility and resiliency of the springs 97 and 102 in all directions enables the tilting of the brush heads 89 in vertical transverse planes and also some slight upward and downward movement of the brush heads whereby the bristles 90 will at substantially all times bear upon the chains 14 in their play relatively to one another in conforming to irregularities in the surface of the ground.

It is to be noted that each of the brush devices 85 is yieldably mounted on its corresponding transverse bar 86 by independent means including supporting springs 97 connected to the elongated brush head 89 at first places adjacent its opposite ends, and a positioning spring 102 connected to such head centrally intermediate its said ends at a second place which is offset laterally from an imaginary line connecting said first places, whereby the brush head is not only movable toward and away from the bar 86 but is also tiltable generally about said line as an axis. Thus, the brush devices have limited independent movement in fore and aft and lateral directions. The links 91 limit lateral movement and the stop means 100, 104 limit reverse tilting in a fore and aft direction when a brush device clears the apron member 94.

The four series of nut engaging devices 85, as shown in FIGURE 1, are also shown in positions in different zones along the path of movement of the chains 62. These positions are designated A, B, C and D. In positions A and B the nut engaging devices are in movement along the upper runs of the chains 62 and along the curved runs of the chains as they are in engagement with the sprockets 65. These may be called normal or inactive positions of the devices 85. In positions C the devices 85 are in forward rectilinear movement conforming to the lower horizontal runs of the chains 62 and in positions D (FIGURES 1 and 24 and dot and dash lines FIGURE 8) they are in upward movement along the apron 94. These may be called active positions in that they are positions in which the bristles 90 are advancing the nuts that have accumulated upon the chains 14. In positions A the nut engaging devices project substantially upward from the chains 62; in positions B they project substantially radially from the sprocket 65; in positions C the heads 89 are in substantial vertical transverse planes; and in positions D the heads are in planes substantially normal to the apron 94. When the nut engaging devices 85 pass from the zone in which they are in position B the bristles 90 will impinge upon the tubular elements 23 (FIGURE 4) and these will oppose such resistance to the forward movement of the devices 85 as to bring the heads 89 into the vertical transverse planes which they occupy during the movement of the devices 85 through the zone in which they are in positions C. In positions C the chains and the nuts exert a backward thrust upon the bristles 90 whereby the heads 89 are tilted backward to some extent from the positions which they would assume as unopposed and the springs 102 are compressed to some extent with the stops 104 spaced from the brackets 100. As shown in dot and dash lines in FIGURE 8, this action is continued as the devices 85 move upward along the hangers 17. This action is also continued in increasing degree as the devices 85 move upward along the apron 94, the springs 97 and 102 being bent substantially into semicircles in opposed relation. The free independent movement of the brush heads 89 effected by the springs 97 is a movement, as shown in FIGURE 8, from positions D to positions E in which the devices 85 extend substantially radially from the sprockets 63, thereafter moving with their parts in the same relation into positions A in which the stops 104 bear against the brackets 100.

When the nuts are discharged into the funnels 50 any pebbles of the size of the nuts or smaller pass with the nuts through the screen bars 58 and into the bags F. Upon the removal of the bags they are taken to a shed and emptied. Since the nuts are clean and free from dust the only processing required is the removal of the small pebbles. When this has been done the bags are refilled and ready for shipment.

I claim:

1. In apparatus for harvesting articles such as nuts lying upon the ground, the combination comprising a frame forwardly movable over the ground, a transverse series of juxtaposed chains resting upon the ground, means connecting the forward ends of said chains to said frame, and means connected to said chains for preventing them from piling upon one another as they are dragged forwardly over the ground, said chains operating upon articles to cause their movement, as lying below said chains upon the ground, to positions above said chains and in which they are supported and movable with said chains.

2. In apparatus for harvesting articles such as nuts lying upon the ground, the combination comprising a frame forwardly movable over the ground, a transverse series of juxtaposed chains resting upon the ground, means connecting the forward ends of said chains to said frame, and means connected to said chains for preventing them from piling upon one another as they are dragged forwardly over the ground and including adjoining ground supported elongated skid elements severally connected to said chains at their rear ends, said chains operating upon articles to cause their movement, as lying below said chains upon the ground, to positions above said chains and in which they are supported and movable with said chains.

3. In apparatus for harvesting articles such as nuts lying upon the ground, the combination comprising a frame forwardly movable over the ground, a transverse series of juxtaposed chains resting upon the ground, means connecting the forward ends of said chains to said frame, and means associated with said chains to minimize their being spread apart by underlying articles or by ground surface irregularities, said chains operating upon articles to cause their movement, as lying below said chains upon the ground, to positions above said chains and in which they are supported and movable with said chains.

4. In apparatus for harvesting articles such as nuts lying upon the ground, the combination comprising a frame forwardly movable over the ground, a transverse series of similar juxtaposed chains resting upon the ground and having several transverse rows of alined links disposed in generally upright planes, means connecting the forward ends of said chains to said frame, and means associated with said chains to minimize their being spread apart by underlying articles or by ground surface irregularities and including a flexible coil spring for each of said rows and extending through those of said alined links in the corresponding one of said rows and provided with retainer means adjacent the outermost links in such corresponding row, said chains operating upon articles to cause their movement, as lying below said chains upon the ground, to positions above said chains and in which they are supported and movable with said chains.

5. In apparatus for harvesting articles such as nuts lying upon the ground, the combination comprising a frame forwardly movable over the ground, a transverse series of juxtaposed chains resting upon the ground, means connecting the forward ends of said chains to said frame, means connected to said chains for preventing them from piling upon one another as they are dragged forwardly over the ground, and means associated with said chains to minimize their being spread apart by underlying articles or by ground surface irregularities, said chains operating upon articles to cause their movement, as lying below said chains upon the ground, to positions above said chains and in which they are supported and movable with said chains.

6. In apparatus for harvesting articles such as nuts lying upon the ground, the combination comprising a frame forwardly movable over the ground and including a transverse rod, a transverse series of juxtaposed chains resting upon the ground, and means connecting the forward ends of said chains to said rod and including hangers having adjoining sleeve members loosely surrounding said rod and arms projecting from said members nad severally connected to said chains, each of said hangers being pivotally movable about said rod, said chains operating upon articles to cause their movement, as lying below said chains upon the ground, to positions above said chains and in which they are supported and movable with said chains.

7. In apparatus for harvesting articles such as nuts lying upon the ground, the combination comprising a frame forwardly movable over the ground, a transverse series of similar juxtaposed chains resting upon the ground, said chains being of substantially the same length and having their links arranged so that there are several transverse rows of alternative links disposed in substantially upright planes, means intermediate the ends of said chains yieldably resisting their spreading apart and including a coil spring extending through the links in each of said rows, means connecting the forward ends of said chains to said frame for individual free movement confined to an upright plane, and means connecting the trailing rear ends of said chains and yieldably resisting their spreading apart and including skid elements severally connected to said rear ends and having transversely alined openings and a coil spring extending through said openings, said chains operating upon articles to cause their movement, as lying below said chains upon the ground, to positions above said chains and in which they are supported upon and movable with said chains.

8. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged on said frame above said chain drag means, and means arranged on said frame between said chain drag means and receptacle means and driven longitudinally along said chain drag means for transferring the articles supported upon said chain drag means into said receptacle means.

9. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged on said frame above said chain drag means and having an opening, and driven brush means arranged on said frame between said chain drag means and receptacle means for sweeping the articles supported upon said chain drag means through said opening into said receptacle means.

10. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, an article collecting receptacle pivotally mounted for movement from a position overhanging said chain drag means to an article discharging position, said receptacle when in said overhanging position including an open article receiving end, a bottom wall upon which the articles accumulate and a top wall provided with an opening, said top wall becoming a bottom wall when said receptacle is in said article discharging position wherein atricles are discharged through said opening, and means operatively disposed between said chain drag means and receptacle when in said overhanging position for transferring the articles supported upon said chain drag means into said receptacle through its said open end.

11. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, an article collecting receptacle pivotally mounted for movement from a position overhanging said chain drag means to an article discharging position, said receptacle when in said overhanging position including an open article receiving end, a bottom wall upon which the articles accumulate and a top wall provided with an opening, said top wall becoming a bottom wall when said receptacle is in said article discharging position wherein articles are discharged through said opening, an article conveying funnel arranged to receive the articles discharged through said opening, means for supporting an article receiving bag in alinement with said funnel and into which the articles are discharged therefrom, and means operatively disposed between said chain drag means and receptacle when in said overhanging position for transferring the articles supported upon said chain drag means into said receptacle through its said open end.

12. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged above said chain drag means and having an opening, and driven means for sweeping the articles supported upon said chain drag means through said opening into said receptacle means, said driven means including a pair of endless driven chains transversely spaced apart and arranged to have a lower run forwardly directed above said chain drag means, a series of brush devices arranged generally in alinement transversely of said driven chains and yieldably mounted thereon for limited independent tilting movement in fore and aft and lateral directions, said brush devices having bristles which during said lower run bear upon said chain drag means thereby to advance the articles resting thereupon.

13. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged above said chain drag means and having an opening, and means for transferring the articles supported upon said chain drag means through said opening into said receptacle means, such transferring means including a pair of endless driven chains transversely spaced apart and arranged to have a lower run forwardly directed above said chain drag means and also an upwardly and forwardly directed front run terminating adjacent said opening, an apron member extending transversely of said chain drag means and operatively arranged between such means and said opening and in spaced substantially parallel relation to said front run and a plurality of brush means severally mounted on said driven chains to extend transversely thereof and arranged at intervals therealong in the direction of travel thereof, each of said brush means including bristles which during said lower run bear upon said chain drag means to advance the articles resting thereupon and which bristles during said front run bear upon said apron member in their upward travel to move the accumulated articles upwardly along said apron member.

14. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged above said chain drag means and having an opening, and means for transferring the articles supported upon said chain drag means through said opening into said receptacle means, such transferring means including a pair of endless driven chains transversely spaced apart and arranged to have a lower run forwardly directed above said chain drag means, a plurality of bars severally mounted on said driven chains transversely thereof and arranged at intervals therealong in the direction of travel thereof, sweeping means associated with each of said bars and including a plurality of brush devices arranged in general transverse alinement and each having a head and bristles projecting therefrom, independent means yieldably mounting each of said brush devices on the corresponding one of said bars and link means connecting the adjacent parts of adjacent heads to maintain said plurality of brush devices in said transverse alinement and permitting a limited degree of their movement, the bristles of said brush devices bearing upon said chain drag means during said lower run thereby to advance the articles resting thereupon.

15. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged above said chain drag means and having an opening, and means for transferring the articles supported upon said chain drag means through said opening into said receptacle means, such transferring means including a pair of endless driven chains transversely spaced apart and arranged to have a lower run forwardly directed above said chain drag means, a plurality of bars severally mounted on said driven chains transversely thereof and arranged at intervals therealong in the direction of travel thereof, sweeping means associated with each of said bars and including a plurality of brush devices each having an elongated head and bristles projecting therefrom, said brush devices being arranged end to end so that their heads are in general transverse alinement, and independent means yieldably mounting each of said brush devices on the corresponding one of said bars and including supporting springs connected to such corresponding bar and also connected to said head at first places adjacent its opposite ends, a positioning spring connected to said corresponding bar and also connected to said head centrally intermediate its said ends at a second place which is offset laterally from an imaginary line connecting said first places, whereby said head is not only movable toward and away from said corresponding bar but is also tiltable generally about said line as an axis, said plurality of brush devices being so positioned with respect to said chain drag means during said lower run that the bristles of said brush devices are pressed upon said chain drag means to flex said springs and tilt said heads as aforesaid in one direction thereby to advance articles resting upon said chain drag means, and stop means for limiting reverse tilting movement of said heads.

16. In apparatus for harvesting articles such as nuts lying upon the ground, the combination comprising a frame forwardly movable over the ground, chain drag means resting upon the ground and trailed from said frame and operating upon articles to cause their movement, as lying below said means upon the ground, to positions above said means and in which they are supported upon and movable with said means, article collecting receptacle means arranged above said chain drag means and having an opening, and means for transferring the articles supported upon said chain drag means through said opening into said receptacle means, such transferring means including a pair of endless driven chains transversely spaced apart and arranged to have a lower run forwardly directed above said chain drag means and also an upwardly and forwardly directed front run terminating adjacent said opening, an apron member extending transversely of said chain drag means and operatively arranged between such means and said opening and in spaced substantially parallel relation to said front run, a plurality of bars severally mounted on said driven chains transversely thereof and arranged at intervals therealong in the direction of travel thereof and sweeping means associated with each of said bars and including a plurality of brush devices arranged in general transverse alinement and each having bristles and spring means mounting said brush devices independently on the corresponding one of said bars and arranged upon flexure to permit said brush devices to tilt about axes respectively extending transversely and longitudinally of said direction of travel and also to permit said brush devices to move toward and away from such corresponding bar, said brush devices being so positioned with respect to said chain drag means during said lower run and also with respect to said apron member during said front run that said springs are flexed to allow said brush devices to tilt as their bristles press against said chain drag means and apron member while sweeping accumulated articles therealong, said spring means effecting a rapid reverse tilting movement of said brush devices as their bristles leave contact with said apron member thereby to cause the accumulated articles as supported by the bristles to be thrown through said opening into said receptacle means.

17. In apparatus for harvesting articles such as nuts lying upon the ground, the combination comprising a wheeled chassis, power drive means on said chassis, means arranged to effect forward propulsion of said chassis by said power drive means, chain drag means resting upon the ground below said chassis and trailed therefrom and operating upon articles to cause their movement, as lying below said chain drag means upon the ground, to positions above said chain drag means and in which they are supported upon and movable with said chain drag means, a receptacle arranged above said chain drag means in an article collecting position and having an article receiving opening disposed adjacent the front end of said chain drag means, means pivotally mounting said receptacle at its rear end on said chassis for movement to an article discharging position in which it projects rearward from its said article collecting position, and means driven by said power drive means and movable forwardly over said chain drag means for accumulating articles supported thereon and transferring them through said opening into said receptacle when in said article collecting position.

References Cited in the file of this patent
UNITED STATES PATENTS

| | | |
|---|---|---|
| 469,160 | Marshall | Feb. 16, 1892 |
| 1,035,613 | Lint | Aug. 13, 1912 |
| 1,150,936 | Furnas | Aug. 24, 1915 |
| 2,718,745 | Scafidi | Sept. 27, 1955 |